(12) United States Patent
Liu

(10) Patent No.: US 8,137,095 B2
(45) Date of Patent: Mar. 20, 2012

(54) DEVICE AND METHOD FOR FORMING CERAMIC FERRULE BLANK

(76) Inventor: Shunfeng Liu, Jiangsu (CN)

( * ) Notice: Subject to any disclaimer, the term of this patent is extended or adjusted under 35 U.S.C. 154(b) by 153 days.

(21) Appl. No.: 12/522,057

(22) PCT Filed: Jun. 12, 2007

(86) PCT No.: PCT/CN2007/001854
§ 371 (c)(1),
(2), (4) Date: Jul. 2, 2009

(87) PCT Pub. No.: WO2008/083533
PCT Pub. Date: Jul. 17, 2008

(65) Prior Publication Data
US 2010/0084774 A1   Apr. 8, 2010

(30) Foreign Application Priority Data
Jan. 3, 2007   (CN) .......................... 2007 1 0019362

(51) Int. Cl.
*A01J 21/00*   (2006.01)

(52) U.S. Cl. ........ 425/443; 425/352; 425/353; 425/354; 425/355; 425/468; 425/128; 425/577; 264/1.25

(58) Field of Classification Search .......... 425/352–355, 425/468, 128, 577, 443; 264/1.25
See application file for complete search history.

(56) References Cited

U.S. PATENT DOCUMENTS

| | | | | |
|---|---|---|---|---|
| 3,628,221 A | * | 12/1971 | Pasbrig | ............................ 403/18 |
| 4,942,009 A | * | 7/1990 | Ohshima | ........................ 264/317 |
| 5,482,451 A | * | 1/1996 | Johnson et al. | ............... 425/116 |

* cited by examiner

*Primary Examiner* — Joseph Del Sole
*Assistant Examiner* — David N Brown, II
(74) *Attorney, Agent, or Firm* — Global IP Services; Tianhua Gu

(57) ABSTRACT

A device and a method for forming a ceramic ferrule blank are provided. A shaped wire (2) is disposed in a mold cavity (1) for form a blank, a knock pin mold (4) is disposed in a lower opening of the mold cavity (1), an axle hole (5) for the shaped wire (2) to pass through is opened in the knock pin mold (4), two punching half dies (6) and corresponding half die press heads (7) are disposed over the mold cavity (1), a wire groove (8) for receiving the shaped wire (2) is opened on a side of the half die press head (7), one end of the shaped wire (2) is fixed over the knock pin mold (4), and the other end is clipped by a wire clip unit (9).

1 Claim, 6 Drawing Sheets

US 8,137,095 B2

DEVICE AND METHOD FOR FORMING CERAMIC FERRULE BLANK

CROSS REFERENCE TO RELATED PATENT APPLICATION

This patent application is the US national stage of PCT/CN2007/001854 filed on Jun. 12, 2007, which claims the priority of the Chinese patent application No. 200710019362.5 filed on Jan. 3, 2007, that application is incorporated herein by reference.

BACKGROUND OF THE INVENTION

1. Field of the Invention

The present invention relates to a mold pressing forming technology, and more particularly to a device and a method for forming a ceramic ferrule blank used in optical fiber communication.

2. Related Art

An optical fiber connector is an important device for optical fiber communication connection, and a ceramic ferrule is also a critical part in the optical fiber connector. A ceramic material has features of high strength, good corrosion resistance, good insulation performance, a smooth surface, and a long service life, and has become a best selection of the ferrule material in the optical fiber connector. Currently, in a device and a method for producing a ceramic ferrule blank, mainly a unidirectional positioning wet injection process is adopted. For example, PRC Patent Publication No. CN1376563A, entitled "Extrusion Forming Mold of Ceramic Ferrule Blank and Forming Technique", disclosed a mold and a technique for manufacturing a zirconium dioxide optical fiber ferrule blank. An extrusion forming mold includes a case, a spiral feeder, a heater, a perforated board, an extrusion reducer pipe with a cooling device, a soft core needle support, and a core needle soft wire. In the forming technique, a raw material is fed from the spiral feeder. The raw material is pushed by a spiral axis, is heated and melted, and forms a melted high pressure fluid in the cavity after passing through the perforated board. The fluid is cooled and changes a size in the reducer pipe, forms a through-rod with an extremely high concentricity under an action of the core needle soft wire. Then, after a cutting process, a dewaxing process, a presintering process, and end processing, a ceramic ferrule blank is obtained. The device and the method for forming the ceramic ferrule blank mainly have the following defects. 1. During the process of forming the blank, the blank material enters the mold cavity of the mold from a material channel injection opening, and forms the blank after the extrusion process. The formed blank is an entirety having the residual raw material from the material channel injection opening, such that a great amount of precious raw materials are wasted in the forming process. 2. The injection process is a wet injection process, such that the blank is easily deformed when being formed. Further, the unidirectional positioning is adopted, such that during the forming process, an inner hole is easily blocked, and the inner hole at the non-positioning end may become eccentric, so as to affect a yield of the blank production. 3. A flowing property of the blank material must be considered when the injection process is adopted, so usually many additives must be added to the formed blank material, and thus, the blank after being sintered may have an uneven density, and is easily deformed. Further, the formed blank has the residual raw material from the material channel injection opening. Therefore, the subsequent finishing allowance is quite large, the working procedure is quite complicated, the production efficiency is low, and the production cost is high.

SUMMARY OF THE INVENTION

The present invention is directed to a device for forming a ceramic ferrule blank, which realizes dry pressing forming of the blank through a bi-directional positioning of a shaped wire during a process of forming the blank, so as to improve precision of forming the blank, reduce a processing allowance of the blank, lower a production cost of products, prevent an inner hole of the blank from being blocked and deformed, and improve a quality of the products.

The present invention is also directed to a device for forming a ceramic ferrule blank, in which a wire clip unit may tighten and clip a shaped wire at the same time, thereby simplifying a structure of the forming device.

The present invention is further directed to a method for forming a ceramic ferrule blank, which realizes dry pressing forming of the blank through a bi-directional positioning of a shaped wire during a process of forming the blank, so as to improve a precision of forming the blank, reduce a process allowance of the blank, lower a production cost of products, prevent an inner hole of the blank from being blocked and deformed, and improve a quality of the products.

To achieve an objective of the present invention, the present invention provides a device for forming a ceramic ferrule blank, which includes a mold cavity for forming a blank, and a shaped wire disposed in the mold cavity. The mold cavity is composed of a through-hole opened in a forming template, a knock pin mold is disposed in a lower opening of the through-hole of the mold cavity, and an axle hole coaxial with the mold cavity is opened in a middle part of the knock pin mold in an axial direction. The shaped wire passes through the axle hole of the knock pin mold, and an end portion is fixed under the knock pin mold. A pair of punching half dies that can be opened and closed are disposed over the mold cavity, a half die press head is respectively disposed on neighboring lateral ends of the two punching half dies. An axial wire groove that is through from top to bottom is respectively opened on a joint surface of the two half die press heads. When the two punching half dies are closed, the two half die press heads on the lateral ends correspondingly match with an upper opening of the through-hole of the mold cavity, the shaped wire passes through a groove hole formed by the wire grooves between the two half die press heads, and the other end portion correspondingly matches with a wire clip unit.

To achieve another objective of the present invention, the present invention provides a device for forming a ceramic ferrule blank, in which the wire clip unit further includes a pair of L-shaped sliding sleeves. The L-shaped sliding sleeves are respectively composed of a transverse sleeve and a longitudinal sleeve that are through internally and connected as a whole. A pushing bar and a restoring spring are respectively disposed in the transverse sleeve, a sliding bar and a restoring spring are respectively disposed in the longitudinal sleeve, an inclined surface is disposed on an end portion of the pushing bar and respectively correspondingly matches with an inclined surface of a lower end portion of the sliding bar. The sliding bar is respectively connected to a clipping head disposed out of the longitudinal sleeve through a pin.

To achieve still another objective of the present invention, the present invention provides a method for forming a ceramic ferrule blank, which includes the following steps. 1) A preparing stage is performed, in which an end portion of a knock pin mold is disposed in a through-hole of a mold cavity, a shaped wire passes through the mold cavity and an axle hole of the knock pin mold, and one end is fixed under the knock pin mold, a pair of punching half dies disposed over the mold cavity are closed, two wire grooves on half die press heads form a groove hole, a shaped wire is just received in the groove hole of the wire grooves, and the other end of the shaped wire is clipped by a wire clip unit after being tightened. 2) A forming stage is performed, in which a blank material for forming a blank is fed in the mold cavity, an action is applied on the two punching half dies, with a matching between the wire grooves and the shaped wire, the two closed punching half dies and the half die press heads move together to the through-hole of the mold cavity along the shaped wire, and after entering the mold cavity, the half die press heads compress and form the blank material together with the knock pin mold. 3) A demolding stage is performed, in which after the blank is formed, the two punching half dies and the half die press heads exit from an upper opening of the through-hole of the mold cavity along the shaped wire, the two punching half dies and the half die press heads are separated from each other, and the wire clip unit loosens the clipped end portion of the shaped wire, meanwhile, the knock pin mold is pushed upwards from a lower opening of the mold cavity, with the matching between the axle hole and the shaped wire, the knock pin mold moves upwards along the shaped wire and passes through the mold cavity, at the same time, the formed blank is entirely pushed out from the through-hole of the mold cavity, and finally the shaped wire is entirely withdrawn from the formed blank. 4) A restoring stage is performed, in which the formed blank is taken away, such that an upper end of the shaped wire is tightened again and is held by the wire clip unit, the two punching half dies and the half die press heads are closed again, and the shaped wire is disposed in the groove hole formed by the two wire grooves, and at the same time, the knock pin mold is retracted and restores an original position, for preparing for a next cycle of forming the blank.

Advantages of the present invention are as follows. 1. In the device and the method, the shaped wire in the mold cavity is bi-directionally positioned, such that the blank material may be directly put into the mold cavity for being dry pressed and formed, the formed blank is not easily deformed and is close to a finished product, and a utilization of the raw material is quite high. 2. A shape of the inner hole of the produced blank is complete, and the inner hole is not blocked and deformed, such that a yield after a sintering process is greatly improved. 3. The blank is close to the finished product, such that subsequent finishing steps of the sintered finished product may be greatly reduced, so a production speed is significantly improved. 4. A great amount of raw materials are saved, and the production speed of the product is greatly improved, such that a production cost of the product is significantly lowered.

BRIEF DESCRIPTION OF THE DRAWINGS

A device and a method for forming a ceramic ferrule blank according to the present invention are further described in detail with the accompanying drawings as follows.

Figure 1:
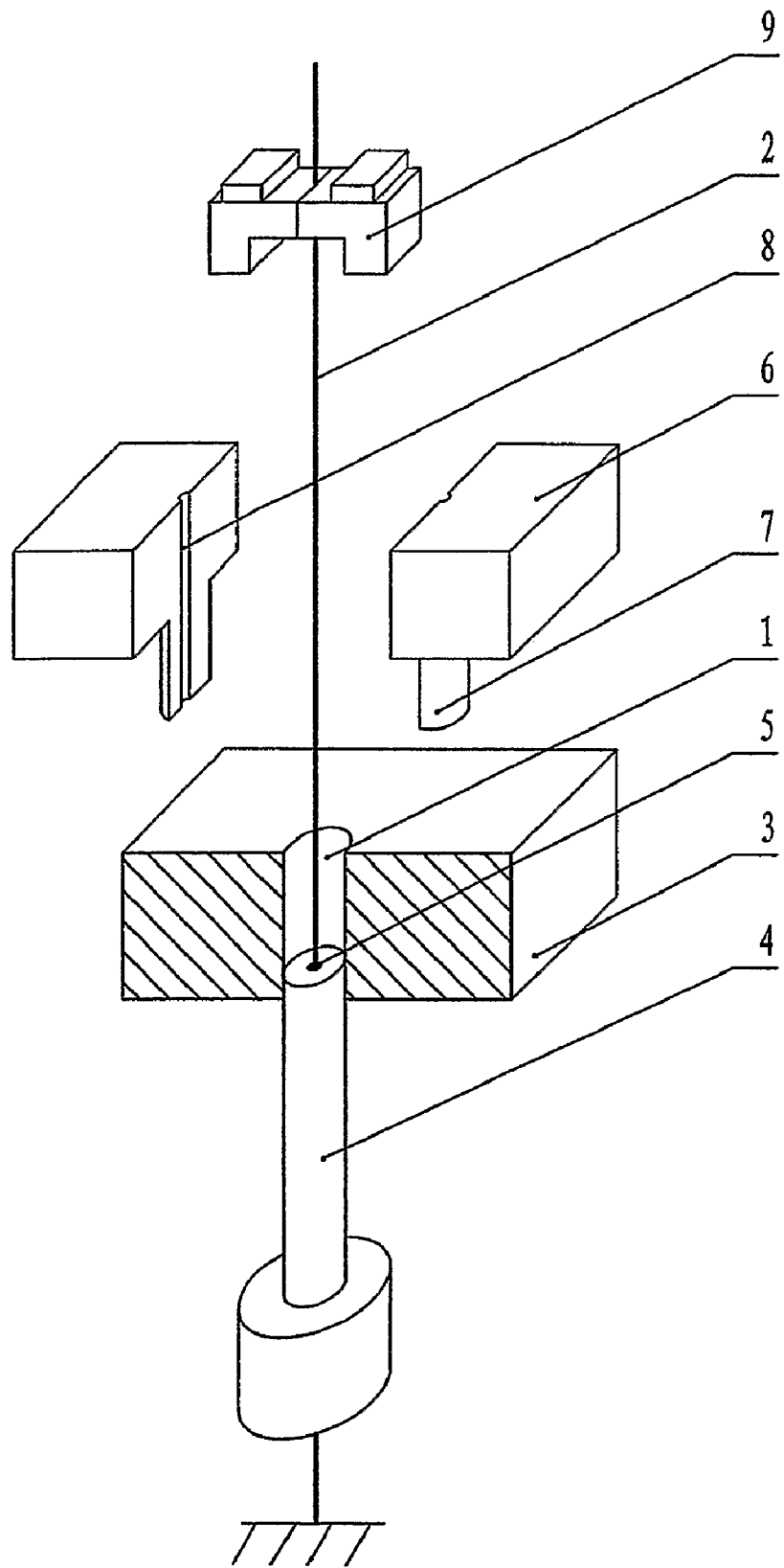
FIG. 1 is a schematic three-dimensional structural view of a device for forming a ceramic ferrule blank according to the present invention.

In the figures: 1. Mold cavity; 2. Shaped wire; 3. Forming template; 4. Knock pin mold; 5. Axle hole; 6. Punching half die; 7. Half die press head; 8. Wire groove; 9. Wire clip unit; 10. Sliding sleeve; 11. Transverse sleeve; 12. Longitudinal sleeve; 13. Pushing bar; 14. Restoring spring; 15. Sliding bar; 16. Restoring spring; 17. Pin; 18. Clipping head

DETAILED DESCRIPTION OF THE INVENTION

Referring to FIGS. 1 to 5, a device for forming a ceramic ferrule blank includes a mold cavity 1 for forming a blank, and a shaped wire 2 disposed in the mold cavity 1. The mold cavity 1 is composed of a through-hole opened in a forming template 3. A knock pin mold 4 is disposed in a lower opening of the through-hole of the mold cavity 1. An axle hole 5 coaxial with the mold cavity 1 is opened on a middle part of the knock pin mold 4 in an axial direction. The shaped wire 2 passes through the axle hole 5 of the knock pin mold 4, and an end portion is fixed under the knock pin mold 4. A pair of punching half dies 6 that can be opened and closed are disposed over the mold cavity 1. A half die press head 7 is respectively disposed on neighboring lateral ends of the two punching half dies 6. An axial wire groove 8 that is through from top to bottom is respectively opened on a joint surface of the two half die press heads 7. When the two punching half dies 6 are closed, the two half die press heads 7 on the lateral ends correspondingly match with an upper opening of the through-hole of the mold cavity 1. The shaped wire 2 passes through a groove hole formed by the wire grooves 8 between the two half die press heads 7, and the other end portion correspondingly matches with a wire clip unit 9. In the present invention, the axle hole 5 of the knock pin mold 4, the wire grooves 8 on the two half die press heads 7 after being closed are consistent with an axial line of the through-hole of the mold cavity 1, and the shaped wire 2 with the two ends tightened is consistent with the axial line.

Figure 6:
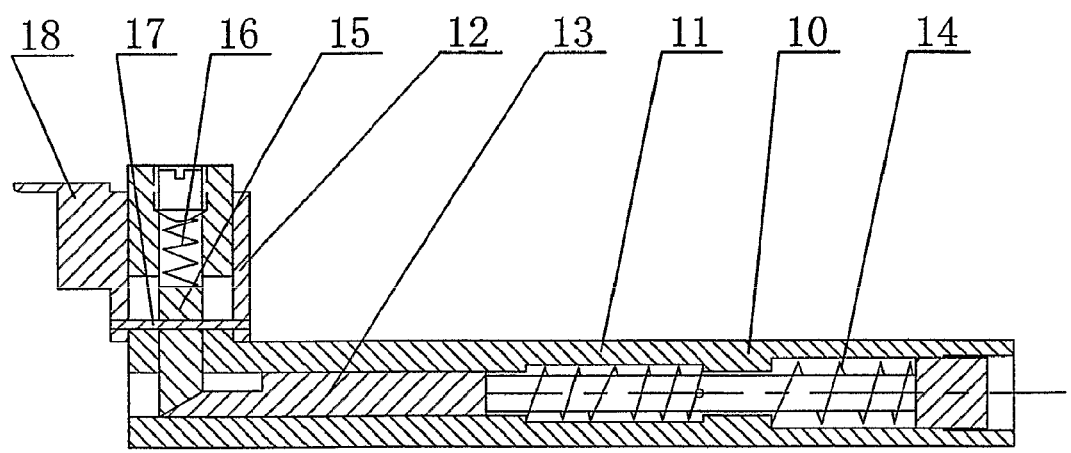
FIG. 6 is a schematic structural view of a wire clip unit of the device for forming the ceramic ferrule blank according to the present invention.

Referring to FIG. 6, the wire clip unit 9 includes a pair of L-shaped sliding sleeves 10. The L-shaped sliding sleeves 10 are respectively composed of a transverse sleeve 11 and a longitudinal sleeve 12 that are through internally and connected as a whole. A pushing bar 13 and a restoring spring 14 are respectively disposed in the transverse sleeve 11, and a sliding bar 15 and a restoring spring 16 are respectively disposed in the longitudinal sleeve 12. An inclined surface is disposed on an end portion of the pushing bar 13 and respectively correspondingly matches with an inclined surface of a lower end portion of the sliding bar 15. The sliding bar 15 is respectively connected to a clipping head 18 disposed out of the longitudinal sleeve 12 through a pin 17.

When the wire clip unit 9 operates, the two L-shaped sliding sleeves 10 are pushed at the same time. The sliding sleeves 10 may drive the clipping heads 18 disposed out of the longitudinal sleeve 12 to relatively move, until the two clipping heads 18 are coincided and clip the shaped wire 2. Then, an action is applied on the pushing bar 13 in the transverse sleeve 11, through an interaction between the inclined surface of the pushing bar 14 and the inclined surface of the lower end portion of the sliding bar 15, the sliding bar 15 overcomes an acting force of the restoring spring 16 to move upwards. Here, the clipping heads 18 may move upwards together with the sliding bar 15, so as to tighten the shaped wire 2 clipped by the clipping heads 18. On the contrary, the two clipping heads 18 may loosen the tightened shaped wire 2, and then entirely release the shaped wire 2.

In the present invention, the wire clip unit 9 may also adopt a structure without a tightening function. That is, during the process of clipping the wire, the shaped wire 2 may be tightened and clipped through other structural forms. For example, firstly the shaped wire 2 is tightened, and then is clipped. Many structural forms for tightening and clipping the shaped wire 2 are available, which will not be listed one by one herein.

A method for forming a blank by using the device for forming the ceramic ferrule blank includes the steps as follows.

Figure 2:
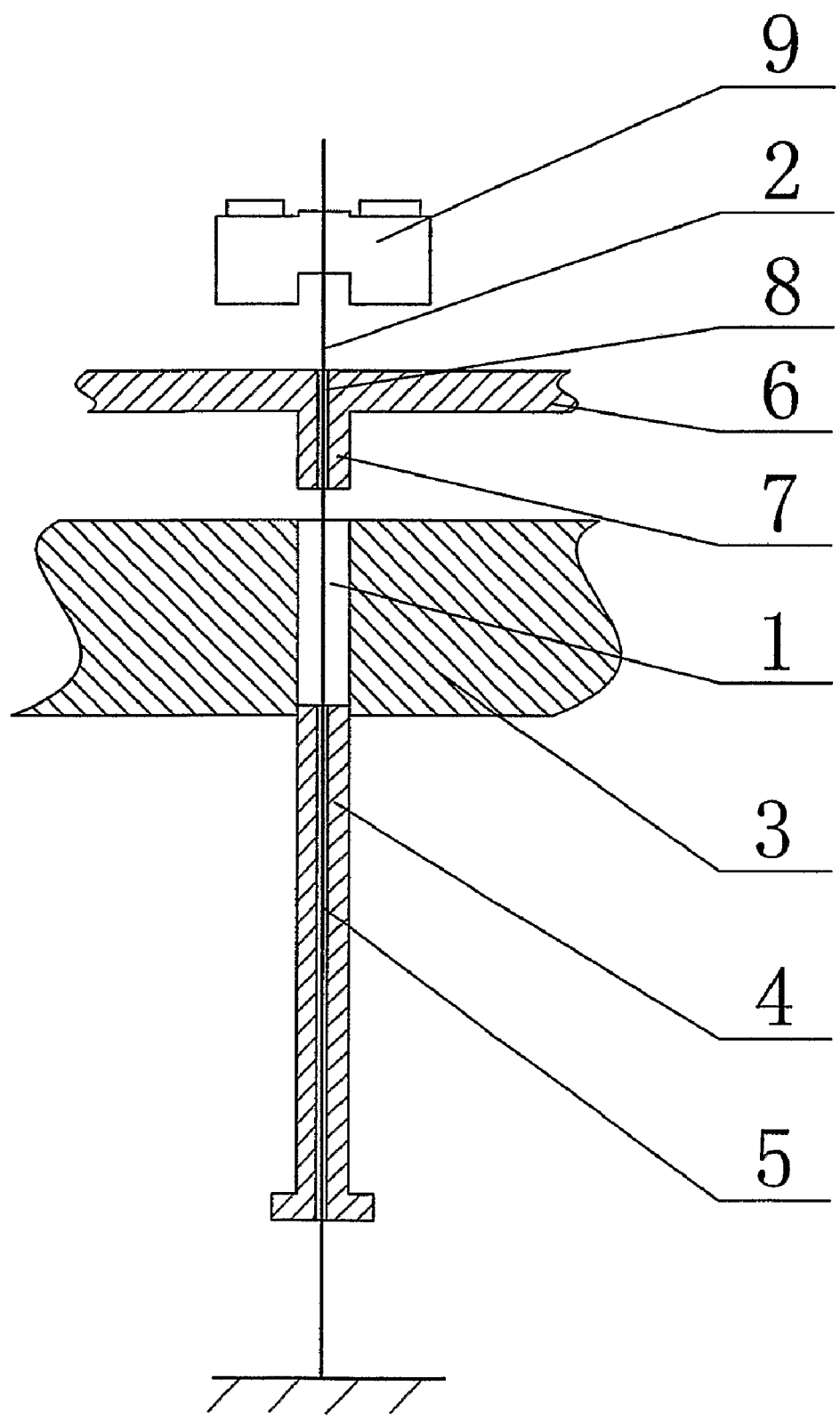
FIG. 2 is a schematic structural view of the device for forming the ceramic ferrule blank in a preparing stage according to the present invention.
Figure 3:
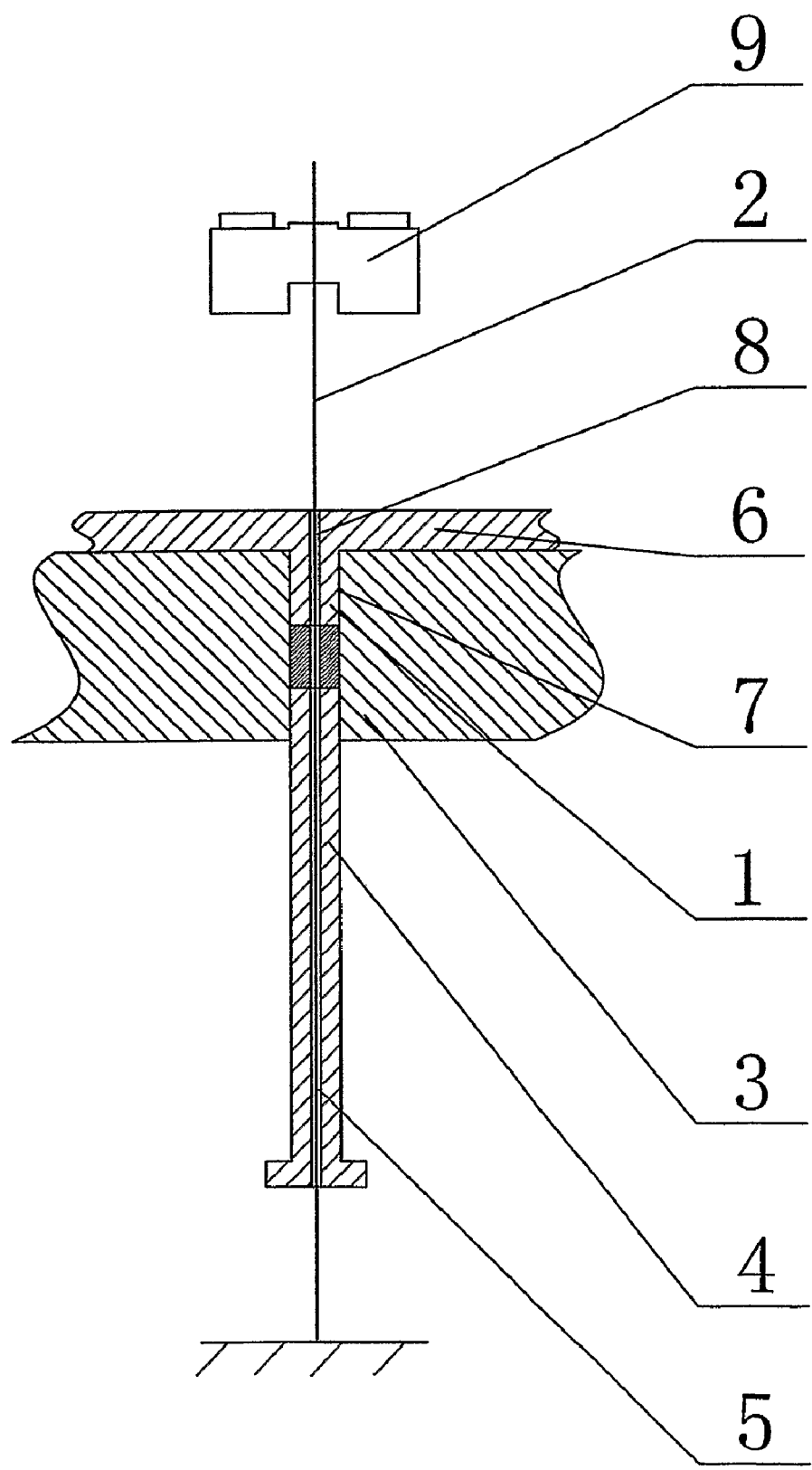
FIG. 3 is a schematic structural view of the device for forming the ceramic ferrule blank in a forming stage according to the present invention.

1. A preparing stage is performed. Referring to FIG. 2, an end portion of the knock pin mold 4 is disposed in the through-hole of the mold cavity 1. The shaped wire 2 passes through the mold cavity 1 and the axle hole 5 of the knock pin mold 4, and one end is fixed under the knock pin mold 4. The pair of punching half dies 6 disposed over the mold cavity 1 are closed, the two wire grooves 8 on the half die press heads 7 form a groove hole, the shaped wire 2 is just received in the groove hole of the wire grooves 8, and the other end of the shaped wire 2 is clipped by the wire clip unit 9 after being tightened 2. A forming stage is performed. Referring to FIG. 3, a blank material for forming a blank is fed in the mold cavity 1, an action is applied on the two punching half dies 6, with a matching between the wire grooves 8 and the shaped wire 2, the two closed punching half dies 6 and the half die press heads 7 move together to the through-hole of the mold cavity 1 along the shaped wire 2. After entering the mold cavity 1, the half die press heads 7 compress and form the blank material together with the knock pin mold 4. During the forming process, the two ends of the shaped wire 2 are always in a tightened state, so as to ensure that the inner hole of the formed blank is not eccentric or blocked.

Figure 4:
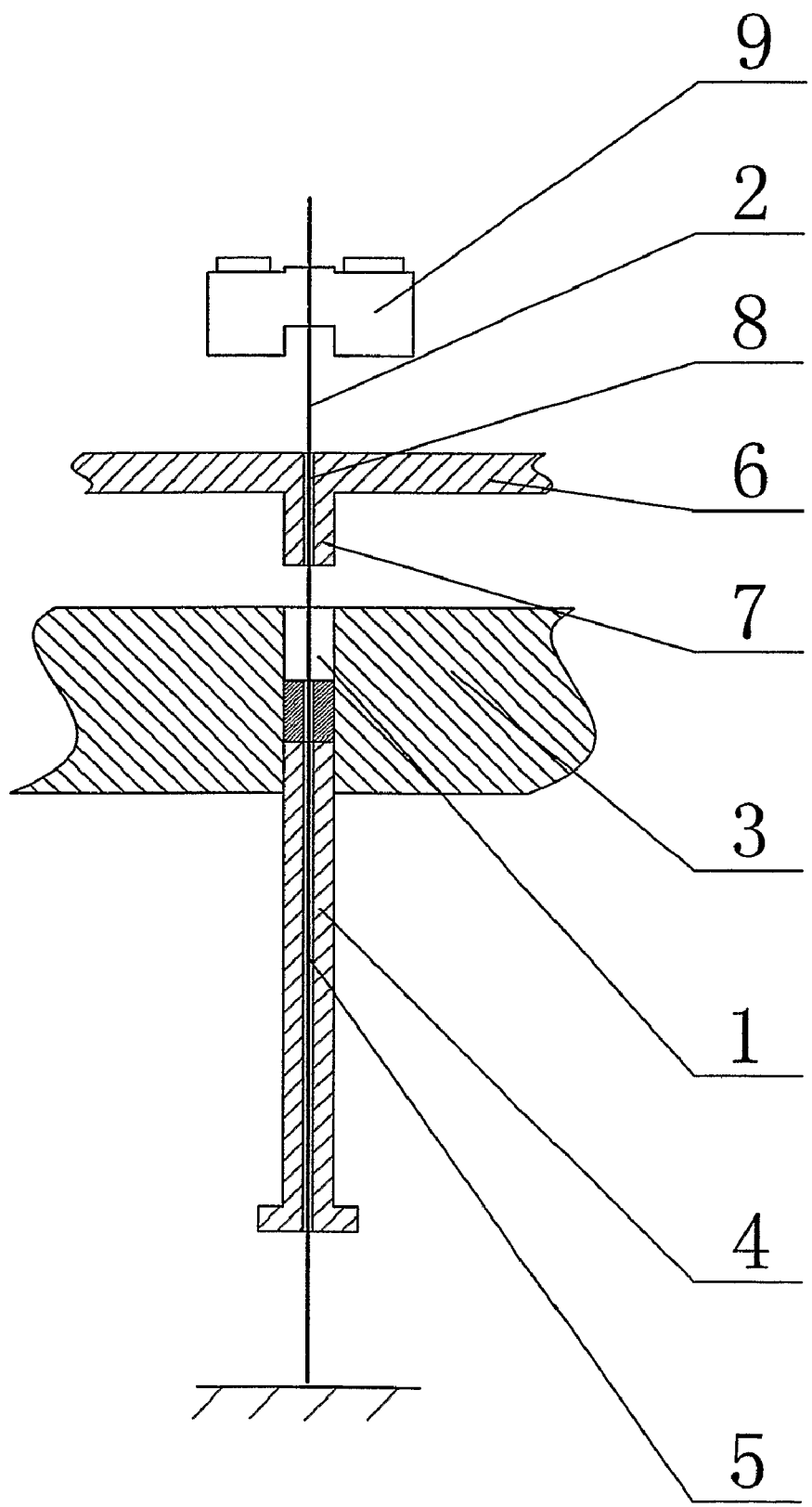
FIG. 4 is a schematic structural view of the device for forming the ceramic ferrule blank in a demolding stage according to the present invention.
Figure 5:
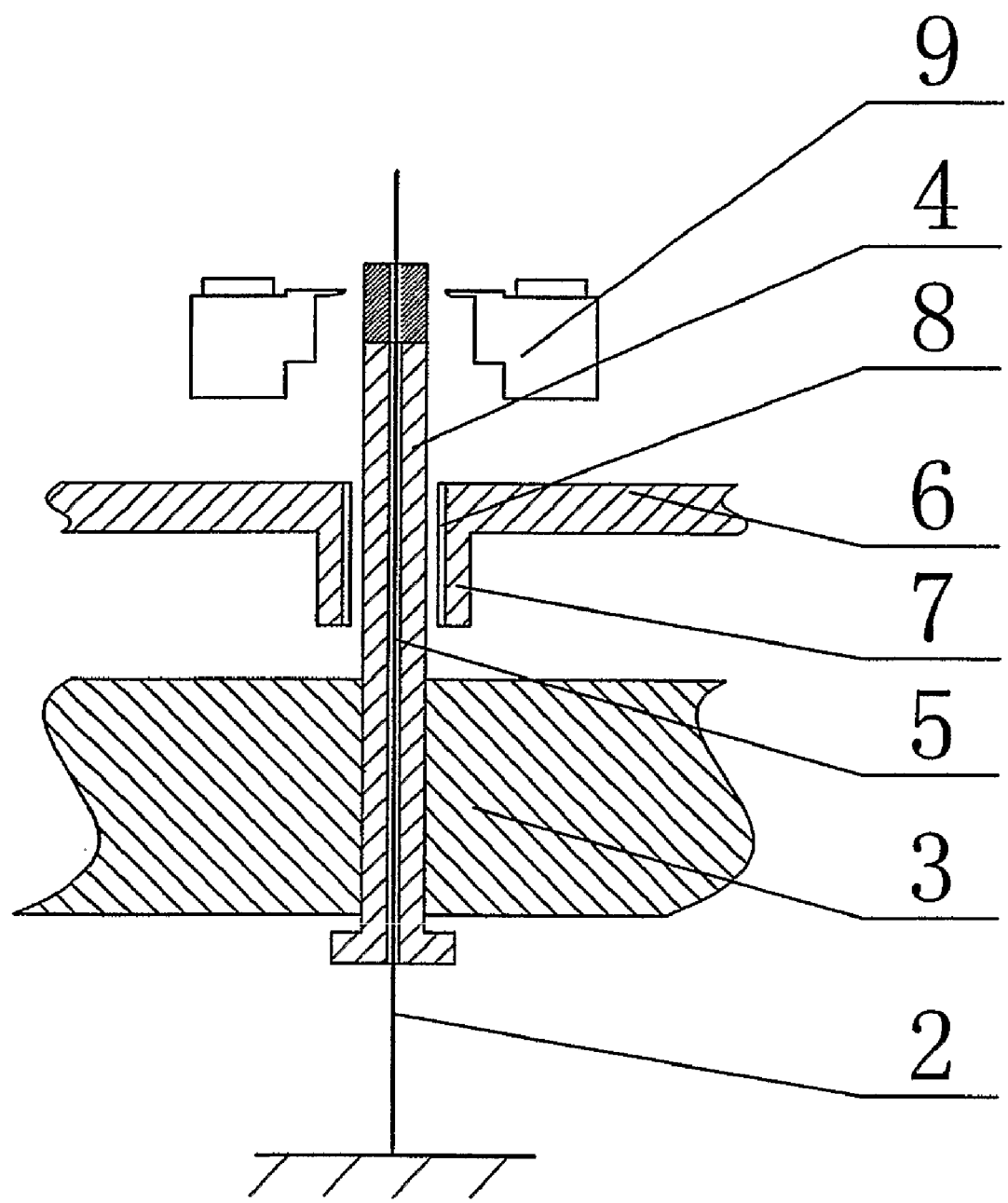
FIG. 5 is a schematic structural view of the device for forming the ceramic ferrule blank in a restoring stage according to the present invention.

3. A demolding stage is performed. Referring to FIGS. 4 and 5, after the blank is formed, the two punching half dies 6 and the half die press heads 7 exit together from an upper opening of the through-hole of the mold cavity 1 along the shaped wire 2. The two punching half dies 6 and the half die press heads 7 are separated from each other, and the wire clip unit 9 loosens the clipped end portion of the shaped wire 2. Meanwhile, the knock pin mold 4 is pushed upwards from a lower opening of the mold cavity 1, with the matching between the axle hole 5 and the shaped wire 2, the knock pin mold 4 moves upwards along the shaped wire 2 and passes through the mold cavity 1. At the same time, the formed blank is entirely pushed out from the through-hole of the mold cavity 1, and finally the shaped wire 2 is entirely withdrawn from the formed blank.

4. A restoring stage is performed. Referring to FIGS. 2 and 5, the formed blank is taken away, such that an upper end of the shaped wire 2 is tightened again and is held by the wire clip unit 9. The two punching half dies 6 and the half die press heads 7 are closed again, and the shaped wire 2 is disposed in the groove hole formed by the two wire grooves 8. At the same time, the knock pin mold 4 is retracted and restored, for preparing for a next cycle of forming the blank, and so on and so forth.

The device and the method are particularly suitable for the dry pressing forming of the ceramic blank. Definitely, in actual applications, the device and the method are applicable to an injection forming of the ceramic blank, and a jet forming of a plastic blank.

What is claimed is:

1. A device for forming a ceramic ferrule blank, comprising a mold cavity (1) for forming a blank, and a shaped wire (2) disposed in the mold cavity (1), wherein the mold cavity (1) is composed of a through-hole opened in a forming template (3), a knock pin mold (4) is disposed in a lower opening of the through-hole of the mold cavity (1), an axle hole (5) coaxial with the mold cavity (1) is opened on a middle part of the knock pin mold (4) in an axial direction, the shaped wire (2) passes through the axle hole (5) of the knock pin mold (4), an end portion is fixed under the knock pin mold (4), a pair of punching half dies (6) that can be opened and closed are disposed over the mold cavity (1), a half die press head (7) is respectively disposed on neighboring lateral ends of the two punching half dies (6), an axial wire groove (8) that is through from top to bottom is respectively opened on a joint surface of the two half die press heads (7), when the two punching half dies (6) are closed, the two half die press heads (7) on the lateral ends correspondingly match with an upper opening of the through-hole of the mold cavity (1), the shaped wire (2) passes through a groove hole formed by the wire grooves (8) between the two half die press heads (7), and the other end portion correspondingly matches with a wire clip unit (9);

the wire clip unit (9) comprises a pair of L-shaped sliding sleeves (10), the L-shaped sliding sleeves (10) are respectively composed of a transverse sleeve (11) and a longitudinal sleeve (12) that are through internally and connected as a whole, a pushing bar (13) and a restoring spring (14) are respectively disposed in the transverse sleeve (11), a sliding bar (15) and a restoring spring (16) are respectively disposed in the longitudinal sleeve (12), an inclined surface is disposed on an end portion of the pushing bar (13) and respectively correspondingly matches with an inclined surface of a lower end portion of the sliding bar (15), the sliding bar (15) is respectively connected to a clipping head (18) disposed out of the longitudinal sleeve (12) through a pin (17).

* * * * *